(12) United States Patent
Kinney et al.

(10) Patent No.: US 11,941,569 B2
(45) Date of Patent: Mar. 26, 2024

(54) ENTITY PATH TRACKING AND AUTOMATION

(71) Applicant: Alarm.com Incorporated, Tysons, VA (US)

(72) Inventors: Abraham Joseph Kinney, Vienna, VA (US); Fabian Emilio Philipe Camargo, Falls Church, VA (US); Noah Robert Weingart, Arlington, VA (US); Andrei Aurelian Furtuna, Annandale, VA (US); David James Hutz, Herndon, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/179,521

(22) Filed: Feb. 19, 2021

(65) Prior Publication Data

US 2021/0182765 A1 Jun. 17, 2021

Related U.S. Application Data

(63) Continuation of application No. 16/015,567, filed on Jun. 22, 2018, now Pat. No. 10,929,798.

(Continued)

(51) Int. Cl.
*G06Q 10/00* (2023.01)
*G06Q 10/0639* (2023.01)

(52) U.S. Cl.
CPC .............. *G06Q 10/06398* (2013.01)

(58) Field of Classification Search
CPC ...................................... G06Q 10/00
See application file for complete search history.

(56) References Cited

U.S. PATENT DOCUMENTS 3,959,633 A 5/1976 Lawrence et al.
3,990,067 A 11/1976 Van Dusen et al.
(Continued)

FOREIGN PATENT DOCUMENTS

JP 2007179366 A * 7/2007

OTHER PUBLICATIONS

B. Bakó, V. E. Bartha, K. Simon, C. Sulyok and L. Kintzel, "EKETour—Software Platform for Organizing Tours," 2018 IEEE 16th International Symposium on Intelligent Systems and Informatics (SISY), Subotica, Serbia, 2018, pp. 000045-000050, doi: 10.1109/SISY.2018.8524797. (Year: 2018).*

(Continued)

*Primary Examiner* — Hafiz A Kassim
*Assistant Examiner* — Zahra Elkassabgi
(74) *Attorney, Agent, or Firm* — Fish & Richardson P.C.

(57) ABSTRACT

Systems and techniques are described for tracking guard tours. In some implementations, the techniques include the actions of receiving data indicating an initiation of a guard tour at the property and by a user, where the guard tour defines a path that includes one or more checkpoints with which the user is instructed to interact. The actions further include analyzing the sensor data. The actions further include determining a location of the user conducting the guard tour at the property. The actions further include based on the location of the user and the path of the guard tour, determining that the user is not following the path of the guard tour. The actions further include based on determining that the user is not following the path of the guard tour, providing, for output, data indicating that the user is not following the path of the guard tour.

25 Claims, 5 Drawing Sheets

Related U.S. Application Data

(60) Provisional application No. 62/523,375, filed on Jun. 22, 2017.

(56) References Cited

U.S. PATENT DOCUMENTS

| | | | |
|---|---|---|---|
| 4,672,654 A | 6/1987 | Vanacore | |
| 5,339,339 A | 8/1994 | Petitclerc et al. | |
| 6,693,530 B1* | 2/2004 | Dowens | G08B 13/22 |
| | | | 340/541 |
| RE38,626 E | 10/2004 | Kielland | |
| 6,834,259 B1 | 12/2004 | Markwitz et al. | |
| 2003/0206100 A1* | 11/2003 | Richman | G08B 13/1966 |
| | | | 340/506 |
| 2005/0080636 A1 | 4/2005 | Markwitz et al. | |
| 2006/0176170 A1 | 8/2006 | Adams | |
| 2006/0248167 A1 | 11/2006 | O'Flaherty et al. | |
| 2008/0082254 A1* | 4/2008 | Huhtala | G01C 21/00 |
| | | | 701/533 |
| 2011/0046920 A1* | 2/2011 | Amis | G08B 25/016 |
| | | | 709/217 |
| 2015/0066557 A1 | 3/2015 | Lichti | |
| 2016/0065658 A1 | 3/2016 | Alon et al. | |
| 2016/0094793 A1 | 3/2016 | Westmacott | |
| 2016/0239787 A1 | 8/2016 | Iwashita | |
| 2016/0266733 A1 | 9/2016 | Alon et al. | |
| 2017/0098181 A1 | 4/2017 | Herman et al. | |
| 2017/0220829 A1 | 8/2017 | Argentieri et al. | |
| 2017/0243080 A1 | 8/2017 | Chriss et al. | |
| 2017/0255894 A1 | 9/2017 | Witkin et al. | |
| 2018/0060796 A1 | 3/2018 | Stefik et al. | |
| 2018/0060798 A1 | 3/2018 | Stefik et al. | |

OTHER PUBLICATIONS

SSI Staff, "How Guard Tour System Monitoring Plays Into Life Safety," Security Sales & Integration, Apr. 30, 2017, 7 pages.

* cited by examiner

200

```
┌─────────────────────────────────────────────────────────────┐
│ RECEIVING DATA INDICATING A PRESENCE OF A USER AT A PROPERTY│
│ MONITORED BY THE MONITORING SYSTEM                          │
│                                                         202 │
└─────────────────────────────────────────────────────────────┘
                              ↓
┌─────────────────────────────────────────────────────────────┐
│ IN RESPONSE TO THE DATA INDICATING THE PRESENCE OF THE USER,│
│ DETERMINING THAT A TIME DURING WHICH THE USER IS PRESENT AT │
│ THE PROPERTY IS WITHIN A PARTICULAR TIME PERIOD DURING      │
│ WHICH A GUARD TOUR SHOULD BE CONDUCTED AT THE PROPERTY  204 │
└─────────────────────────────────────────────────────────────┘
                              ↓
┌─────────────────────────────────────────────────────────────┐
│ DETERMINING A DYNAMICALLY GENERATED GUARD TOUR FOR THE USER │
│ TO FOLLOW BASED ON OBTAINING AND ANALYZING SENSORY DATA FROM│
│ THE MONITORING SYSTEM                                   206 │
└─────────────────────────────────────────────────────────────┘
                              ↓
┌─────────────────────────────────────────────────────────────┐
│ PROVIDING AN INDICATION TO THE USER TO START THE GUARD TOUR │
│                                                         208 │
└─────────────────────────────────────────────────────────────┘
                              ↓
┌─────────────────────────────────────────────────────────────┐
│ PROVIDING THE DYNAMICALLY GENERATED GUARD TOUR TO THE USER  │
│ FOR INITIATING THE GUARD TOUR                               │
│                                                         210 │
└─────────────────────────────────────────────────────────────┘
```

```
┌─────────────────────────────────────────────────────────────┐
│ RECEIVING AN INDICATION FROM A USER INDICATING AN INITIATION OF A │
│           GUARD TOUR PATH AT A PROPERTY                      │
│                                                         302  │
└─────────────────────────────────────────────────────────────┘
                              │
                              ▼
┌─────────────────────────────────────────────────────────────┐
│ OBTAINING DATA INDICATING A PRESENCE OF THE USER AT CHECKPOINTS │
│  ALONG THE GUARD TOUR PATH ON THE PROPERTY MONITORED BY A    │
│                  MONITORING SYSTEM                      304  │
└─────────────────────────────────────────────────────────────┘
                              │
                              ▼
┌─────────────────────────────────────────────────────────────┐
│  IN RESPONSE TO OBTAINING DATA INDICATING THE PRESENCE OF THE │
│ USER AT EACH OF THE CHECK POINTS ON THE PROPERTY, DETERMINING │
│      WHETHER THE USER IS FOLLOWING THE GUARD TOUR PATH       │
│                                                         306  │
└─────────────────────────────────────────────────────────────┘
                              │
                              ▼
┌─────────────────────────────────────────────────────────────┐
│ IN RESPONSE TO DETERMINING THAT THE USER IS NOT FOLLOWING THE │
│ GUARD TOUR PATH, PROVIDING AN INDICATION TO THE USER TO RETURN │
│                  TO THE GUARD TOUR PATH                 308  │
└─────────────────────────────────────────────────────────────┘
                              │
                              ▼
┌─────────────────────────────────────────────────────────────┐
│ PROVIDING AN INDICATION TO A PROPERTY OWNER OF THE PROPERTY  │
│       THAT THE USER IS NOT FOLLOWING THE GUARD TOUR PATH     │
│                                                         310  │
└─────────────────────────────────────────────────────────────┘
```

RECEIVING AN INDICATION FROM A USER INDICATING AN INITIATION OF A GUARD TOUR PATH AT A PROPERTY  402

RECEIVING DATA FROM DEVICES INCLUDED IN THE MONITORING SYSTEM MONITORING THE PROPERTY  404

DETERMINING THE DATA INCLUDES UNUSUAL ACTIVITY BY COMPARING THE DATA TO PREDETERMINED DATA VALUES AND DETERMINING THE DATA EXCEEDS THE PREDETERMINED DATA VALUES  406

DETERMINING A LOCATION ON THE PROPERTY ASSOCIATED WITH UNUSUAL ACTIVITY  408

IN RESPONSE TO DETERMINING THE LOCATION ON THE PROPERTY ASSOCIATED WITH THE UNUSUAL ACTIVTY, PROVIDING THE LOCATION AS A CHECK POINT ON THE GUARD TOUR PATH TO THE USER  410

FIG. 4

ENTITY PATH TRACKING AND AUTOMATION

CROSS-REFERENCE TO RELATED APPLICATIONS

This application is a continuation of U.S. application Ser. No. 16/015,567, filed Jun. 22, 2018, now allowed, which claims the benefit of U.S. Provisional Application Ser. No. 62/523,375, filed Jun. 22, 2017. Both of these prior applications are incorporated by reference in their entirety.

TECHNICAL FIELD

This specification relates generally to security monitoring systems.

BACKGROUND

Guards can be a strong deterrent to theft and crimes on various premises. For example, typical usages of guards to deter theft and crime include acting as a sentry to control security access to an area, as a customer service ambassador, and escorting customers and employees to various secure locations. People who employee guards want to ensure that the guards are doing their tours properly.

SUMMARY

The subject matter of the present disclosure is related to techniques for using an integrated security environment to monitor a guard tour path at a monitored property. Specifically, the integrated security environment includes a security system and a control unit inside the monitored property. The security system monitors activity patterns for individuals at the monitored property. The security system performs the monitoring by communicating with the control unit at the monitored property. The security system obtains sensor data from the control unit in order to monitor and learn activity patterns for individuals and guards located at the monitored property. In addition, the security system may provide a guard with a guard tour path to take at the monitored property for ensuring the monitored property is secure. The guard tour path may include checkpoints to ensure the guard is following the guard tour path. In response to the security system detecting an unexpected event while the guard walks the guard tour path, the security system can notify an owner of the monitored property and the guard of the particular event occurring at the monitored property.

In some implementations, the security system may notify the owner of the monitored property based on an activity pattern of the guard during the guard tour at the monitored property. For example, the owner of the monitored property, John may, hire a guard to tour a path around his monitored property while John is not home. John may securely arm his home for detection and leave for the night at 9:00 PM. John pays the guard to tour the path around his monitored property while John is out. The security system can provide the guard with a path to tour around John's monitored property in response to detecting the arrival of the guard. The path to tour may include one or more checkpoints that the guard needs to sequentially hit in a predetermined period. In this instance, one or more checkpoints may include flicking a light switch in the basement, badging into the front door, and being visually recognized with a camera utilizing a facial recognition system, to name a few examples, that the security system interprets to mean the guard meets a checkpoint. The security system may transmit a notification to John's cellular device when the guard hits each of the checkpoints. Additionally, the security system may transmit a notification to John's cellular device if the guard does not hit the checkpoint in the predetermined period or should another checkpoint be hit with a different indication than the one prescribed for that checkpoint.

In one general aspect, a method is performed by one or more computers of a monitoring system, the monitoring system that is configured to monitor a property, the monitoring system including one or more sensors that are located throughout the property and a monitor control unit. The method includes: receive, from a user, data indicating an initiation of a guard tour at the property; receive, from the user, data indicating a presence of the user at a checkpoint along a path of the guard tour; after receiving the data indicating the presence of the user at the checkpoint along the path of the guard tour, analyze sensor data from a sensor of the one or more sensors; based on analyzing the sensor data, determine a location of the user; based on the location of the user and the path of the guard tour, determine that the user is not following the path of the guard tour; and, based on determining that the user is not following the path of the guard tour, provide, for output, an instruction to return to that checkpoint.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, in some implementations, the monitor control unit is configured to update the path of the guard tour based on the sensor data; and provide, to the user, data indicating the updated path of the guard tour.

In some implementations, the method further includes wherein the monitor control unit is configured to update the path of the guard tour by: identifying one or more additional checkpoints that each indicate a location within the property with which the user is instructed to interact.

In some implementations, the method further includes the monitor control unit is configured to generate a time threshold for the user to move from the checkpoint to an additional checkpoint; determine an amount of time that has elapsed since receiving the data indicating the presence of the user at the checkpoint; compare the amount of time that has elapsed since receiving the data indicating the presence of the user at the checkpoint to the time threshold; based on comparing the amount of time that has elapsed since receiving the data indicating the presence of the user at the checkpoint to the time threshold, determine that the amount of time is greater than the time threshold; and determine that the user is not following the path of the guard tour further based on determining that the amount of time is greater than the time threshold.

In some implementations, the method further includes one or more electronic devices that are located throughout the property and that are configured to change state in response to an instruction from the monitor control unit, wherein the monitor control unit is configured to provide, for output, an instruction to return to the checkpoint by: identifying at least one of the one or more electronic devices that are located between the location of the user and the checkpoint; and providing, for output, an instruction to the at least one of the one or more electronic devices to change state.

In some implementations, the method further includes the monitor control unit is configured to update the path of the guard tour based on the sensor data by based on the sensor data, determine that an additional user is located at an additional location at the property; and updating the path of the guard tour without including the additional location at the property where the additional user is located.

In some implementations, the method further includes the path of the guard tour defines a route around the monitored property for the user to follow.

In some implementations, the method further includes the checkpoint is a location along the path of the guard tour where the user is instructed to initiate a data transmission to the monitor control unit indicating that the user is located at the checkpoint.

According to another innovative aspect of the subject matter described in this application, a monitoring system that is configured to monitor a property and for tracking a guard tour includes one or more sensors that are located throughout the property and that are configured to generate sensor data; and a monitor control unit that is configured to receive data indicating an initiation of a guard tour at the property and by a user, wherein the guard tour defines a path that includes one or more checkpoints with which the user is instructed to interact; receive, from the one or more sensors, the sensor data; after receiving the data indicating the initiation of the guard tour at the property, analyze the sensor data; based on analyzing the sensor data, determine a location of the user conducting the guard tour at the property; based on the location of the user and the path of the guard tour, determine that the user is not following the path of the guard tour; and based on determining that the user is not following the path of the guard tour, provide, for output, data indicating that the user is not following the path of the guard tour.

These and other implementations can each optionally include one or more of the following features. The monitor control unit is configured to update the path of the guard tour based on the sensor data; and provide, for output, data indicating the updated path of the guard tour. The monitor control unit is configured to update the path of the guard tour based on the sensor data by, based on the sensor data, determining that a person is located at an additional location at the property; and based on determining that the person is located at the additional location at the property, updating the path of the guard tour. The monitor control unit is configured to update the path of the guard tour by identifying one or more additional checkpoints that each indicate an additional location within the property with which the user is instructed to interact. The monitor control unit is configured to determine a current time of day; and update the path of the guard tour further based on the current time of day.

The monitor control unit is configured to after receiving the data indicating the initiation of the guard tour at the property, generate a time threshold for the user to move to a checkpoint of the one or more checkpoints; determine an amount of time that has elapsed since receiving the data indicating initiation of the guard tour; compare the amount of time that has elapsed since receiving the data indicating initiation of the guard tour to the time threshold; based on comparing the amount of time that has elapsed since receiving the data indicating initiation of the guard tour to the time threshold, determine that the amount of time is greater than the time threshold; and determine that the user is not following the path of the guard tour further based on determining that the amount of time is greater than the time threshold. The monitor control unit is configured to provide, for output, the data indicating that the user is not following the path of the guard tour by providing, to a property owner of the property, the notification indicating that the user is not following the path of the guard tour.

Each of the one or more checkpoints is configured to initiate, in response to user interaction, a data transmission to the monitor control unit indicating that the user is located at the checkpoint. The monitor control unit is configured to, based on determining that the user is not following the path of the guard tour, provide, for output to the user, an instruction to return to a checkpoint of the one or more checkpoints. The monitoring system includes one or more electronic devices that are located throughout the property and that are configured to change state in response to an instruction from the monitor control unit. The monitor control unit is configured to provide, for output, an instruction to return to the checkpoint by identifying at least one of the one or more electronic devices that is located near both the location of the checkpoint; and providing, for output, an instruction to the at least one of the one or more electronic devices to change state. The monitor control unit is configured to receive data indicating a presence of the user at a checkpoint of the one or more checkpoints; and determine the location of the user conducting the guard tour at the property further based on a location of the checkpoint.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flowchart of an example process for providing a dynamically generated guard tour path to the user for the monitored property.

FIG. 3 is a flowchart of an example process for providing, to a guard and to a property owner, an indication that the guard is not following a guard tour path.

FIG. 4 is a flowchart of an example process for adding an additional checkpoint on the guard tour path in response to determining a location on the monitored property associated with unusual activity.

DETAILED DESCRIPTION

Figure 1:
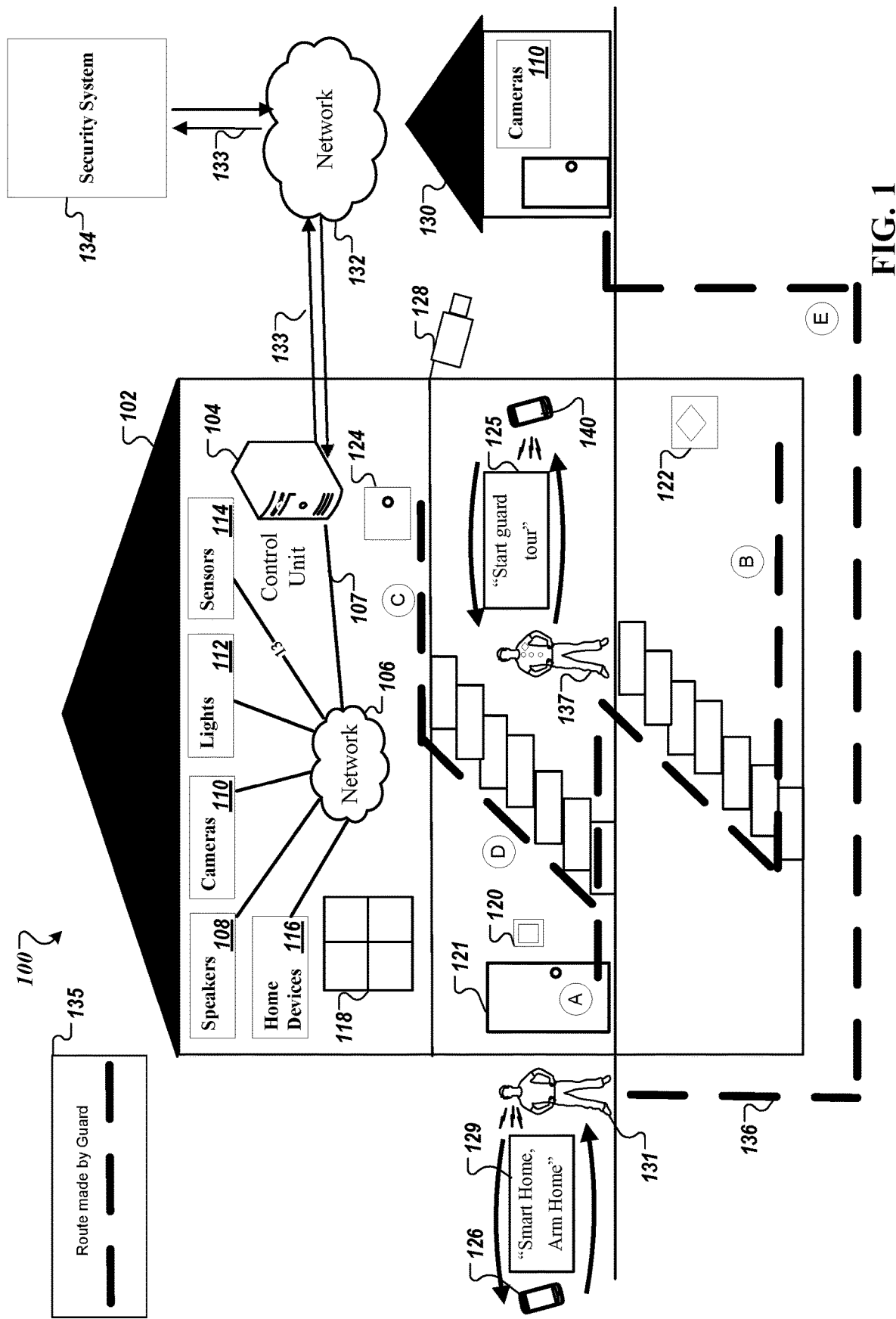
FIG. 1 is a contextual diagram of an example system of an integrated security environment for monitoring and tracking guard tours in a monitored property.

FIG. 1 is a contextual diagram of an example system of an integrated security environment 100 for monitoring and tracking guard tours in a monitored property. Though system 100 is shown and described including a particular set of components including a control unit server 104, a network 106, speakers 108, cameras 110, lights 112, sensors 114, home devices 116, network 132, communication links 133, security system 134, the present disclosure need not be so limited. For instance, in some implementations only a subset of the aforementioned components may be used by the integrated security environment for monitoring the control unit of the monitored property. As an example, there may be implementations that do not use the speakers 108. Similarly, there may be implementations that the security system 134 is stored in the control unit server 104. Yet other alternative exemplary systems also fall within the scope of the present disclosure such as a system that does not use a control unit server 104. For these reasons, the system 100 should not be viewed as limiting the present disclosure to any particular set of necessary components.

As shown in FIG. 1, a monitored property 102 of an owner is monitored by a control unit server 104 that includes components within the monitored property 102. The integrated security environment 100 further includes an outhouse 130, which may be used as a stop on a checkpoint. The monitored property 102 may be a residential facility, such as a home, a commercial facility, such as an office building, or a storage facility, such as a warehouse, to name a few examples. The components within the monitored property 102 may include one or more speakers 108, one or more cameras 110, one or more lights 112, one or more sensors 114, and one or more home devices 116. The one or more cameras 110 may include video cameras that are located at the exterior of the monitored property 102 near the front door 121, as well as located at the interior of the monitored property 102 near the front door 121. For example, video camera 128 may be placed at the exterior of the monitored property 102 for visually recognizing an individual approaching the monitored property 102. The video camera 128 may record images or video of individuals, send the images or video to the control unit server 104 to perform techniques related to facial recognition to recognize the individual approaching the monitored property 102. The one or more sensors 114 include a motion sensor located at the exterior of the monitored property 102, a front door sensor that is a contact sensor positioned at the front door 121, a pressure sensor that receives button presses at a light device 122, and a lock sensor that is positioned at the front door 121 and each window 118. The contact sensor may sense whether the front door 121 or the windows 118 is in an open position or a closed position. The lock sensor may sense whether the front door 121 and each window 118 is in an unlocked position or a locked position. The one or more home devices 116 may include home appliances such as a washing machine, a dryer, a dishwasher, an oven, a stove, a microwave, and a laptop, to name a few examples. Additionally, should the monitored property 102 be a commercial facility, the one or more devices 116 may include a printer, a copier, a vending machine, and a fax machine to name a few examples.

The control unit server 104 communicates over a wired or wireless connection over network 106 with connected devices such as each of the one or more speakers 108, one or more cameras 110, one or more lights 112, one or more home devices 116 (washing machine, a dryer, a dishwasher, an oven, a stove, a microwave, a laptop, etc.), and one or more sensors 114 to receive sensor data descriptive of events detected by the one or more speakers 108, the one or more cameras 110, the one or more lights 112, and the one or more home devices 116 in the monitored property 102. In other implementations, the security system 134 may communicate with the one or more speakers 108, the one or more cameras 110, the one or more lights 112, the one or more home devices 116, and the one or more sensors 114 without directly communicating through the control unit server 104. In some implementations, the connected devices may connect via Wi-Fi, Bluetooth, or any other protocol used to communicate over network 106 to the control unit server 104. Additionally, the control unit server 104 communicates over a long-range wired or wireless connection with a security system 134 over network 132 via communication links 133. In some implementations, the security system 134 is located remotely from the monitored property 102, and manages the monitoring at the monitored property 102, as well as other (and, perhaps, many more) monitoring systems located at different monitored properties that are owned by various users. In other implementations, the security system 134 is located locally at the monitored property 102. The security system 134 communicates bi-directionally with the control unit server 104. Specifically, the security system 134 receives sensor data descriptive of events detected by the sensors included in the monitoring system of the monitored property 102. Additionally, the security system 134 transmits instructions of the control unit server 104 for particular events.

In the example shown in FIG. 1, a property owner 131 may prepare to leave the monitored property 102. The property owner can include a manager, a boss, a home owner, or a family member of the home owner, to name a few examples. In doing so, the property owner 131 may turn off each of the one or more lights 112, turn off each of the one or more home devices 117, lock the front door 121, and close and lock each of the one or more windows 118. In some implementations, the property owner 131 may interact with a client device 126 to activate a signature profile, such as "arm home" for the monitored property 102. The client device 126 (and client device 140) may display a web interface, an application, or a device specific for a smart home system. The client device 126 can be, for example, a desktop computer, a laptop computer, a tablet computer, a wearable computer, a cellular phone, a smart phone, a music player, an e-book reader, a navigation system, a security panel, or any other appropriate computing device. In some implementations, the client device 126 may communicate with the control unit server 104 using the network 106 and one or more communication links 107. The network 106 may be wired or wireless or a combination of both and can include the Internet.

In some implementations, the property owner 131 may communicate with the client device 126 to activate a signature profile for the monitored property 102. To illustrate, the property owner 131 may first instruct the control unit server 104 to set a signature profile for arming the monitored property 102. For example, property owner 131 may use a voice command to say "Smart Home, Arm Home," as shown in FIG. 1. The voice command may include a phrase, such as "Smart Home" to trigger the client device 126 to actively listen to a command following the phrase. Additionally, the phrase "Smart Home" may be a predefined user configured term to communicate with the client device 126. The client device 126 can send the voice command to the control unit server 104 over the network 106, and the one or more communication links 107. The control unit server 104 may notify the security system 134 that monitored property 102 is to be armed. In addition, the control unit server 104 may set parameters to arm the monitored property 102 in response to receiving the voice command. Moreover, the control unit server 104 can send back a confirmation to the client device 126 in response to arming the monitored property 102 and setting the armed parameters. For example, the control unit server 104 may send back a response to display a message on the client device 126 that says "home armed."

In some implementations, in order for the control unit server 104 to allow the property owner 131 and others to activate a signature profile case for the monitored property 102, the property owner 131 and others may define and store signature profiles in the control unit server 104. In other implementations, the property owner 131 and others may define and store signature profiles in the security system 134. The signature profile may be associated with each user and allow for various use cases of the devices in the monitored property 102. Each of the signature profiles can be associated with one user, such as property owner 131 and guard 137. For example, property owner 131 may create a signature profile for arming the monitored property 102. Additionally, the property owner 131 may create a signature profile for the guard 137 for monitoring a guard travelling around the monitored property 102 on a guard tour path 136. In some implementations, the signature profile for monitoring the guard around the monitored property 102 may include a guard tour path 136 that is dynamically generated.

In some implementations, the property owner 131 may store one or more parameters associated with a use case in his or her signature profile. Specifically, the one or more parameters for each use case may describe settings for the guard tour path use case, a volume level in decibels (DB) of the speakers 108, an aperture amount for the cameras 110, a brightness intensity level of the lights 112, turning on home devices 116 such as a television, laptop, one or more fans, setting a specific temperature of a thermostat, opening or closing the shades of window 118 a particular amount, and any other parameters to describe the use case. For example, the property owner 131 may create a signature profile with a use case for "guard tour path." The property owner 131 may define the one or more parameters to silence the speakers 108, with a volume level of −110 dB, an aperture of f/16 for the one or more cameras 110, 1100 lumens brightness for the one or more lights 112, turning off a television, a laptop, no fans, unlocking the front door, turning on the video camera 128, setting the thermostat to 68 degrees Fahrenheit, and fully opening the blinds of the one or more windows 118.

In some implementations, the control unit server 104 can set the parameters for "arming the home" in response to the property owner 131 instructing through the client device 126 to arm the home. Specifically, the one or more parameters for "arming the home" may include not playing a song, a volume level of 0 dB for the speakers 108, an aperture of f/16 for the one or more cameras 110, zero lumens for the one or more lights 112, turning off a television, turning off a laptop, no fans, setting the thermostat to 67 degrees Fahrenheit, and fully closing the blinds of the one or more windows 118. Additionally, the control unit server 104 increases the sensitivity associated with each of the one or more sensors 114 for the "arming the home" use case. Specifically, control unit server 104 may increase the sensitivity for the front door sensor and the lock sensor by a predetermined factor so that smaller movements of the front door or garage door trigger an alarm event. For example, the sensitivity may be increased by a factor of five.

In some implementations, the control unit server 104 may send a response to display a message on the client device 126 that says "home armed" once the control unit server 104A sets the parameters. In addition, the control unit server 104A transmits a message to the security system 134 that the monitored property 102 finished arming. At this point, the user 126 may leave the monitored property 102.

In some implementations, a guard 137 may arrive at the monitored property 102 and the property owner 131 is not at the monitored property 102. In other implementations, the guard 137 may arrive while the property owner 131 is located at the monitored property 102. The one or more sensors 114 and the one or more cameras 110 with processing performed by the control unit server 104 may recognize the guard 137 upon his or her arrival. For example, the one or more cameras 110 may transmit the video feed to the control unit server 104 for performing facial recognition software to recognize the individual as the guard 137. Additionally, the guard 137 may interact with a security panel 120 to identify himself or herself to the monitored property 102. The control unit server 104 may receive the information regarding the facial recognition and/or the information from the security panel 120 and transfer the information to the security system 134. The security system 134 may execute facial recognition software on the received feed to recognize the individual by comparing the facial recognition results to stored facial data. Additionally, the security system 134 may compare the results of the information from the security panel 120, such as a keyed pin, to stored information for a particular user. Should the security system 134 determine that the facial recognition results match stored facial data of a guard 137, the security system 134 may transmit an instruction to unlock to the front door 121.

In some implementations, the security system 134 may compare a current time with a time to start a guard tour in the "guard tour path" signature profile in response to determining the results of the facial recognition is found to be the guard 137. If the current time falls within the time to start the guard tour, the security system 134 transmits an indication to the control unit server 104 to set the parameters associated with the "guard tour path" signature profile. In response to setting the parameters associated with the "guard tour path" signature profile, the control unit server 104 transmits an indication back to the security system 134 indicating completion of setting the "guard tour path" signature profile. Additionally, the security system 134 transmits a notification to the client device 140 associated with the guard 137 to alert the guard 137 to start the guard tour. Specifically, the client device 140 may display a message to the guard 137 stating "Start guard tour." In other implementations, a guard tour time may not be required by the "guard tour path" signature profile and the guard 137 may tour the monitored property 102 each time he or she arrives at the monitored property 102.

In some implementations, the security system 134 may provide a guard tour path 136 associated with the "guard tour path" signature profile to the client device 140. The guard tour path 136 may include one or more checkpoints that the guard 137 interacts with in the integrated security environment 100. Examples of a checkpoint can include a location, such as the front porch or the back porch, at the monitored property 102. Additionally, a checkpoint can include interaction at a specific location, such as interacting with a light switch or triggering a motion sensor. For example, in order for the guard 137 to reach a checkpoint, the guard 137 must interact with the light switch at the front porch. In another example, in order for the guard 137 to reach a checkpoint, the guard 137 must reach the front porch at the monitored property 102. The security system 134 may generate the guard tour path 136 based on a location of the one or more speakers 108, the one or more cameras 110, the one or more lights 112, the one or more sensors 114, and the one or more home devices 116. The security system 134 may add checkpoints to the guard tour path 136 in locations around the monitored property 102 that have a higher density of these monitored and unmonitored devices. In other implementations, the security system 134 may add checkpoints to the guard tour path 136 in locations around the monitored property 102 that have a low density of these monitored and unmonitored devices to ensure the monitored property 102 is properly secured in each area. For example, unmonitored devices, such as electronic devices, may include televisions, thermostats, garage door openers, and grills. To ensure the guard 137 interacts with the checkpoints along the guard tour path 136 in a timely manner, the guard 137 must interact with one or more devices at each checkpoint within a predetermined period. In response to interacting with at least one or more of the devices at each checkpoint within a predetermined period, the at least one or more of the devices transmits a notification to the control unit server 104. For example, then the guard 137 flicks a light switch at the front porch from off to on with the predetermined time period, the light switch can transmit a notification to the control unit server 104. The control unit server 104 determines that the notification received from the one or more devices that the indicates the guard 137 has arrived at the checkpoint. For example, the control unit server 104 may ensure that the guard 137 moves between each checkpoint within 10 minutes. Should the guard 137 not interact with at least one device at the checkpoint until after the predetermined period, e.g., 10 minutes, the control unit server 104 can send an indication to the security system 134 that the guard 137 is off path. In some implementations, the control unit server 104 may track the client device 140 associated with the guard 137 using a GPS sensor included in the client device 140. Should the control unit server 104 notice the client device 140 veering off the guard tour path 136, the control unit server 104 can send an indication to the security system 134 that the guard 137 is off path. In response to the security system 134 receiving the indication that the guard 137 is off path, the security system 134 can take action to notify various users. For example, the security system 134 may transmit a notification to the client device 126 associated with the property owner 131 indicating that the guard tour 131B is not following the guard tour path 136. In addition, the security system 134 may transmit a notification to the client device 140 associated with the guard 137. For example, the notification may include a push notification, a short messaging service (SMS), or an instant message. In some implementations, the security system 134 may further transmit a notification to the supervisor of the guard 137 to notify that the guard 137 is veering off course of the guard tour path 136. In response, the guard 137 may receive a phone call from the supervisor to find out what the status is of the guard tour. In another example, the security system 134 may transmit a request to the client device 126 requesting if a call to the client device 140 should be placed. Should the property manager 131 accept the request, the security system 134 can place a phone call from client device 126 to client device 140.

In some implementations, the property owner 131 may forget to arm the monitored property 102 upon leaving the monitored property 102. In this case, the speakers 108, the cameras 110, the lights 112, the sensors 114, and the home devices 116 may be in a different state than if they were set to the "armed home" parameters. As a result of the different state, the one or more sensors 114 and the one or more cameras 110 may recognize the guard 137 upon his or her arrival. For example, the one or more cameras 110 may transmit the video feed to the control unit server 104 for performing facial recognition software to recognize the individual as the guard 137. The control unit server 104 and the security system 134 may determine the individual to be the guard 137. In response, the security system 134 may transmit an indication to the control unit server 104 to set the parameters associated with the guard tour path based on the state of the alarm devices. For example, the security system 134 may transmit an indication to the control unit server 104 to set the parameters associated with the "guard tour path with house unarmed" signature profile upon detecting the individual as the guard 137 and detecting the monitored property 102 as being unarmed. Specifically, the "guard tour path with house unarmed" signature profile may provide a guard tour path, such as guard tour path 136, with more checkpoints to ensure more areas of the monitored property 102 are covered by the guard 137. Additionally, the security system 134 may provide a guard tour path 136 to the client device 131B associated with the guard 137 upon receiving indications of activity associated with particular areas of the monitored property 102. For example, the control unit server 104 may receive indications that movement and other characteristics, such as window 118 opening and closing frequently, were found in the second floor near the window 118. In response, the control unit server 104 may transmit a notification to the security system 134 to indicate adding a checkpoint on the guard tour path 136 near the window 118. The security system 134 may provide the checkpoint near the window 118 upon detecting the guard 137 arriving at the monitored property 102. Other signature profiles for the guard tour path may be defined based on one or more individuals in the monitored property 102, which will be further explained below.

In some implementations, should the control unit server 104 notice the client device 140 veering off the guard tour path 136, the control unit server 104 may try to utilize one or more of the speakers 108, the cameras 110, the lights 112, the sensors 114, and the home devices 116 to keep the guard 137 on the guard tour path 136. For example, after stage (B), the guard 137 makes his or her way to the front door 121 instead of moving towards the checkpoint in stage (C). The control unit server 104 may use the one or more sensors 114, such as motion sensors, to determine that the guard 137 is moving towards the front door 121 rather than up the stairs towards the second level. In response to determining that the guard 137 is moving off the guard tour path 136 and moving towards the front door 121, the control unit server 104 may transmit a notification to the front door to lock the front door 121. In addition, the control unit server 104 may turn off each of the one or more lights 112 in the monitored property 102 and turn on each of the lights 112 above the staircase leading towards the checkpoint in stage (C). This may be one of the control unit server 104's method of notifying the guard 137 for the direction to take on the guard tour path 136. In another example, the control unit server 104 may play a song out of the speakers 108 located at the checkpoint in stage (C), such as Aerosmith's "Walk This Way" to indicate to the guard 137 to move towards that direction up the staircase. Other possibilities with each of the speakers 108, cameras 110, lights 112, sensors 114, and home devices 116 for steering the guard 137 back to the path of guard tour path 136 are possible, the aforementioned examples were provided to give examples of methods.

As mentioned above, the guard tour path 136 can include one or more checkpoints that the guard 137 interacts with to provide evidence that the guard completes his or her tour in a timely manner. For example, during stage (A), the guard 137 enters the monitored property 102 by interacting with the security panel 120. The guard 137 interacting with the security panel 120 can include entering a key pin associated with the guard 137, badging the security panel 120 with a badge associated with the guard 137, or guard 137 interacting with the security panel 120 using a biometric identifier. In response to guard 137 interacting with the security panel 120, the security panel 120 may send an indication to the control unit server 104 to notify that guard 131131B has hit his first checkpoint on the guard tour path 136. The control unit server 104 can determine from the indication that the guard 137 has hit the first checkpoint on the guard tour path 136. Additionally, the control unit server 104 may send a notification to the security system 134 to indicate that the guard 137 is at the first checkpoint. In response, the security system 134 may transmit an unlock indication to the control unit server 104 to instruct the control unit server 104 to unlock the front door 121 to allow the guard to enter the monitored property 102 through the front door 121. In some implementations, the security system 134 may further transmit a notification to the client device 126 associated with the property owner 131 to notify that the guard 137 has initiated the guard tour. In other implementations, the security system 134 may further transmit a notification to the client device 140 associated with the guard 137 to notify the guard 137 of the next checkpoint. In other implementations, the security system 134 may transmit each of the checkpoints to the client device 140 after prompting the guard 137 to start the guard tour.

During stage (B), the guard 137 enters the basement of the monitored property 102. In the basement of the monitored property 102, the guard 137 interacts with a light device 122. Should the control unit server 104 receive this notification before the predetermined period finishes and determine that the notification indicates the guard 137 reached the light device 122, the control unit server 104 restarts the predetermined period and waits for an indication from a device that does not identify the guard 137. Alternatively, the control unit server 104 restarts the predetermined period and waits for an indication from a device that indicates that the guard 137 has hit the next checkpoint. In some implementations, the method in which the guard 137 interacts with the light device 122 may trigger a notification to be sent to the control unit server 104. The control unit server 104 may determine from this notification that the guard 137 has arrived at the next checkpoint. For example, the light device 122 can include one or more light switches and a dimmer. The guard 137 may press the one or more light switches in a particular pattern, such as three times. The one or more light switches may send an indication to the control unit server 104 that the one or more light switches have been pressed three times. The control unit server 104 can determine from the notification that the one or more light switches having been pressed three times indicates the guard 137 has arrived at the checkpoint. In order for the control unit server 104 to make this determination, the control unit server 104 compares the received indication with the light switch to set interactions with the light device stored in a signature profile. Additionally, set interactions exist for each of the devices and are stored in memory the control unit server 104. Alternatively, if the guard 137 presses the one or more light switches two times, the one or more light switches may send an indication to the control unit server 104 that the one or more light switches have been pressed two times. The control unit server 104 cannot determine from the indication that the one or more light switches having been pressed two times indicates that the guard 137 has arrived at the checkpoint. In another example, the guard 137 may move the dimmer slider between 0 and 100 percent four times. In response, the dimmer can send a notification to the control unit server 104 to indicate that the dimmer slider has been moved between 0 and 100 percent four times. The control unit server 104 can determine from this notification from the dimmer that the guard 137 has arrived at the checkpoint by comparing the received indication of the dimmer slider having moved between 0 and 100 percent four times to set interactions with the dimmer slider stored in a signature profile. In another example, the guard 137 may hold at least one of the light switches on the light device 122 down for three seconds to indicate to the control unit server 104 that the guard 137 has arrived at the checkpoint.

During stage (C), the guard 137 leaves the basement by walking up the first set of stairs and walking up the second set of stairs on the main floor to the second floor. Specifically, the guard 137 walks to the second floor of the monitored property 102 and interacts with a particular home connection device 124, such as a z-wave device, within the predetermined period. For example, the particular home connection device 124, such as the z-wave device, can include one or more buttons and one or more locks that communicate with a smart home device, such as a control unit server 104. In some implementations, the guard 137 can interact with the particular home connection device 124 by pressing the one of the one or more buttons for a predetermined amount of time or pressing the one or more buttons in a sequential order to send a notification to the control unit server 104 and the control unit server 104 can determine from the notification that the guard 137 has arrived at the checkpoint. In another implementation, the particular home connection device 124 may include a thermostat that the guard 137 may interact with to send a notification to the control unit server 104 and the control unit server 104 can determine from the notification that the guard 137 has arrived at the third checkpoint.

In some implementations, the control unit server 104 may require the guard 137 to interact with the one or more devices at each of the checkpoints because an intruder may not interact with that particular device in the same way. Specifically, an intruder may break into a monitored property 102 and may not interact with one or more switches on the light device 122 in the same way the guard 137 may be required. For example, the guard 137 may be required to press at least one of the one or more switches on the light device 122 for longer than three seconds, whereas, the intruder will sneak past the light device 122 in order to avoid turning on the lights and being noticed.

In some implementations, the control unit server 104 may receive data from a motion sensor indicating movement outside of the monitored property 102 that triggers an alarm. However, as the movement may come from a guard 137, the guard 137 may interact with the security panel 120 outside of the monitored property 102 to perform a set of interactions that clearly indicates to the control unit server 104 the guard 137 arrived at the monitored property 102. For example, the guard 137 may press a light switch in the security panel 120 three times. The light switch in the security panel 120 may send an indication to the control unit server 104. The control unit server 104 may determine from the indication that the guard 137 interacted with the light switch in the security panel 120 by comparing the data in the received indication, that the light switch was pressed three times, to a set of interactions associated with the light switch in a signature profile. Should the comparison match, the control unit server 104 determines the guard 137 interacted with the light switch and disables the alarm. Alternatively, should the comparison not match, the control unit server 104 can send an indication to the security system 134 over the network 132 to notify the property owner 131 and the local police of a potential intruder at the monitored property 102.

In some implementations, the guard 137 may not need to interact with one or more devices using his or her hands at a checkpoint along the guard tour path 136 in order to determine that the guard 137 has indeed arrived at the checkpoint. Alternatively, the integrated system environment 100 may use other methods to determine that the guard 137 has indeed arrived at the checkpoint. For example, upon arriving at the checkpoint in stage (C), the guard 137 may be instructed by the application on the client device 140 to look into one of the cameras 110 located at the checkpoint. The cameras 110 may record a snapshot or video clip of a face of the guard 137. In response, the cameras 110 may transmit the snapshot or the video clip to the control unit server 104, which can transmit the snapshot or the video clip to the security system 134 for facial recognition processing. The security system 134 can use facial recognition processing to recognize the guard 137 at the third checkpoint and compare results of the facial recognition processing to stored facial data. Should the security system 134 determine that the facial recognition results match stored facial data of a guard 137, the security system 134 may transmit an indication to the control unit server 104 indicating that the guard 137 has indeed arrived at the third checkpoint. In response to receiving the indication from the security system 134, the control unit server 104 may restart the predetermined period and waits for the guard 137 to hit the next checkpoint.

During stage (D), the guard tour path 136 may indicate to the guard 137 that the last checkpoint was reached. In response, the control unit server 104 may instruct the guard 137 to restart the guard tour on the guard tour path 136. In other implementations, the control unit server 104 may notice one or more unusual activities occurring at the outhouse 130. For example, the control unit server 104 may receive an indication that one or more sensors 114 located at the outhouse 130 may be triggered, such as a lock sensor, a pressure sensor, or a movement sensor. The control unit server 104 may receive an indication from the one or more sensors 114 located at the outhouse 130 and determine that unusual activities may be occurring. The control unit server 104 can determine this is unusual activity because the indication received from the sensor allows the control unit server 104 to determine that a location where the received data came from does not match any location found on the guard tour path 136. Additionally, those one or more sensors 114 that monitor an area not near a guard tour path 136 should not be providing unusual data to the control unit server 104. The control unit server 104 may compare the received indication from the one or more sensors 114 to predetermined values for the one or more sensors 114 during the specific guard tour path 136. The predetermined values may indicate to the control unit server 104 values that the one or more sensors 114 should provide while the guard 137 is on the guard tour path 136. Specifically, the predetermined values may dynamically change based on a location of the guard 137 on the guard tour path 136. For example, the one or more sensors 114 located in the basement during stage (B) may be more active when the guard 137 is located in the basement while the one or more sensors 114 located near the outhouse 130 should be idle. Therefore, the control unit server 104 transmits a notification to the client device 140 associated with the guard 137 that indicates to the guard 137 a new checkpoint added to the guard tour path 136. In response to receiving the new path added to the guard tour path 136 at the client device 140, the guard 137 may interact with the client device 140 to indicate to the control unit server 104 an acceptance of adding the new checkpoint to the guard tour path 136. Additionally, the control unit server 104 transmits the notification to the security system 134 to indicate an update to the checkpoints on the guard tour path 136. In response, the security system 134 may transmit a notification to the client device 126 associated with the property owner 131 to indicate that a new checkpoint has been added to the guard tour path 136.

During stage (E), the guard tour path 136 now includes a new checkpoint at the outhouse 130. The guard 137 makes his or her way from the front door 121 to the outhouse 130 to check for unusual activity. In some implementations, the guard 137 may provide an indication to the control unit server 104 regarding the unusual activity at the outhouse 130. For example, should the guard 137 notice any unusual activity at the outhouse 130, the guard 137 may provide a response to the application on the client device 140 indicating that unusual activity did occur at the outhouse. The unusual activity may include an intruder breaking into the outhouse 130, an individual or animal moving past the outhouse 130 triggering a motion sensor of the sensors 114, or the cameras 110 located on the outhouse 130 being destroyed or recognizing a face near the outhouse 130. If the guard 137 determines unusual activity did occur at the outhouse 130 and the response was sent to the control unit server 104, the control unit server 104 may send an indication to the security system 134 notifying of a break in by an intruder at the monitored property 102, and specifically, at the outhouse 130 of the monitored property 102. The security system 134 may transmit a notification to the client device 126 associated with the property owner 131 that an intrusion has occurred at the outhouse 130 of the monitored property 102.

In some implementations, the security system 134 may notify the guard 137 on the associated client device 140 of a failed access event. For example, if an individual, such as a random individual, tries to badge into the security panel 120, the security panel 120 sends an indication to the control unit server 104, and the control unit server 104 determines from the indication that the badge does not meet any badges associated with signature profiles, then the control unit server 104 determines a failed badge entry. In response to determining a failed badge entry at the security panel 120 by the control unit server 104, the control unit server 104 may transmit a notification to the security system 134 to notify of the failed event at the security panel 120. In response, the security system 134 may transmit a notification to the client device 126 associated with the property owner 131 to indicate that a failed event has occurred at the security panel 120. In addition, the security system 134 may transmit the notification to the client device 140 associated with the guard 137 to indicate that the failed event has occurred at the security panel 120 and to check out the security panel 120. In response, the guard 137 may accept the notification and provide a notification back to the security system 134 to verify a receipt of the notification. In other implementations, the failed access event may include an inactive card badged at the outhouse 130, a failed security panel 120, a failed light device 122, and a failed particular home connection device 124.

In some implementations, the guard tour path 136 may be adjusted by the control unit server 104 and/or the security system 134 based upon a determination that one or more individuals may have visited a particular area along the guard tour path 136. For example, the control unit server 104 may determine that the property owner 131 had recently visited the basement near the light device 122 while the guard 137 is preparing to visit stage (B) in the basement. Specifically, the control unit server 104 may determine that the property owner 131 may be recognized by cameras 110 using facial recognition software at the security system 134 and the property owner 131 interacted with the one or more light switches on the light device 122. As a result of the facial recognition software at the security system 134 and a determination that the result of the facial recognition software includes an identification of the property owner 131, the security system 134 may provide an updated guard tour path 136 to the client device 140, removing the path to stage (B). The path to stage (B) is removed because the security system 134 determined that the property owner 131 was found at the location of stage (B), and that checkpoint does not need to be checked until a predetermined amount of time has elapsed. For example, this predetermined amount of time may be 30 minutes or 1 hour.

In some implementations, the guard tour path 136 may be adjusted by the control unit server 104 and/or the security system 134 based on a determination of a state of the sensors 114 and the cameras 110. For example, the control unit server 104 may determine that severe weather may be impending around the monitored property 102. Specifically, the thermostat included in the sensors 114 and the outdoor pressure sensors provided outside the monitored property 102 may determine that the weather outside is severe enough to warrant removing stage (E) from the guard tour path 136. For example, the control unit server 104 may compare the values of the thermostat and the outdoor pressure sensors to predetermined severe weather values. If the values of the thermostat and the outdoor pressure sensors exceed the predetermined severe weather values, such as the temperature outside being below 32 degrees Fahrenheit or the outdoor pressure sensor values measuring the wind speed over 60 miles per hour, the control unit server 104 may transmit a notification to the security system 134 indicating that each of the outdoor paths included in the guard tour path 136 be removed. In response, the security system 134 may transmit a notification to the client device 126 associated with the property owner 131 to indicate that stage (E) will be removed from the guard tour path 136 due to dangerous weather conditions. In addition, the security system 134 may transmit the notification to the client device 140 associated with the guard 137 to indicate that stage (E) will be removed from the guard tour path 136 due to dangerous weather conditions. In response, the guard 137 may accept the notification, provide a notification back to the security system 134 to verify a receipt of the notification, and not walk to stage (E) along the guard tour path 136.

In some implementations, the guard tour path 136 may be adjusted by the control unit server 104 and/or the security system 134 based on a current time of day. For example, the control unit server 104 may determine that from 8:00 AM to 12:00 PM, the basement in stage (B) does not need to be guarded. Alternatively, the property owner 131 may instruct the smart home application on client device 126 by providing a command saying, "Smart Home, Remove Basement from Guard Tour." In response to receiving the command, the client device 126 may provide the command to the control unit server 104, which provides an indication to the security system 134 to remove the basement in stage (B) from the guard tour path 136. The security system 134 may transmit a notification to the client device 126 to indicate that stage (B) will be removed from the guard tour path 136 due to received instructions. In addition, the security system 134 may transmit the notification to the client device 140 to indicate that stage (B) will be removed from the guard tour path 136 due to received instructions. In response, the guard 137 may accept the notification, provide a notification back to the security system 134 to verify a receipt of the notification, and not walk to stage (B) along the guard tour path 136.

In some implementations, the guard tour path 136 may be adjusted by the control unit server 104 and/or the security system 134 based on a number of individuals in the monitored property 102. For example, the control unit server 104 may determine that one or more individuals, such as family members of the property owner 131, may be located near the outhouse 130. Specifically, the control unit server 104 may receive indications from a motion sensor in the sensors 114 and a video camera 128 using facial recognition to recognize the one or more individuals located outside the monitored property 102 near the outhouse 130. In response to receiving the indications, the control unit server 104 may provide an indication to the security system 134 to determine if the location associated with the received indications from the sensors 114 and the video camera 128 matches a location found on the guard tour path 136. Should the security system 134 determine that the location associated with the received indications match a location found on the guard tour path 136, the security system 134 may remove that location, e.g. stage (E) near the outhouse 130, from the guard tour path 136. The security system 134 may transmit a notification to the client device 126 to indicate that stage (E) will be removed from the guard tour path 136 due to known individuals already found outside the outhouse 130. In addition, the security system 134 may transmit the notification to the client device 140 to indicate that stage (E) will be removed from the guard tour path 136 due to known individuals already found outside the outhouse 130. In response, the guard 137 may accept the notification, provide a notification back to the security system 134 to verify a receipt of the notification, and not walk to stage (E) along the guard tour path 136. In other implementations, should the security system 134 determine that the location associated with the received indications does not match a location found on the guard tour path 136, the control unit server 104 and the security system 134 may allow the guard to visit that location associated with the received indications without sending a warning to the guard 137 and the property owner 131. The individuals found in the location associated with the received indications may not pose a security threat to the monitored property 102, and therefore, does not need to be checked by the guard 137.

FIG. 2 is a flowchart of an example process 200 for providing a dynamically generated guard tour to the user for initiating guard tour. Generally, the process 200 includes receiving data indicating a presence of a user at a property monitored by the monitoring system; in response to the data indicating the presence of the user, determining that a time during which the user is present at the property is within a particular time period during which a guard tour should be conducted at the property; determining a dynamically generated guard tour for the user to follow based on obtaining and analyzing sensor data from the monitoring system; providing an indication to the user to start the guard tour;

and, providing the dynamically generated guard tour to the user for initiating the guard tour.

During 202, the control unit server 104 receives data indicating a presence of a user, such as a guard at 131B, at a monitored property 102. Specifically, the one or more sensors 114 and the one or more cameras 110 may recognize the guard 137 upon his or her arrival. For example, the one or more cameras 110 may transmit the video feed to the control unit server 104 for performing facial recognition software to recognize the individual as the guard 137. Additionally, the guard 137 may interact with a security panel 120 to identify himself or herself to the monitored property 102. The control unit server 104 may receive the information regarding the facial recognition and/or the information from the security panel 120 and transfer the information to the security system 134. The security system 134 may perform facial recognition on the received feed to recognize the individual by comparing the image data to stored facial data. Additionally, the security system 134 may compare the results of the information from the security panel 120, such as a keyed pin, to stored information for a particular user. Should the security system 134 determine that the image data matches stored facial data of a guard 137, the security system 134 may transmit an unlock to the front door 121.

During 204, in response to the data indicating the presence of the guard 137, the security system 134 may determine that a time during which the user is present at the monitored property 102 is within a particular time period during which a guard tour should be conducted at the monitored property 102. Specifically, the security system 134 may compare a current time with a time to start a guard tour in the "guard tour path" signature profile in response to determining the results of the facial recognition is found to be the guard 137. If the current time falls within the time to start the guard tour, the security system 134 transmits an indication to the control unit server 104 to set the parameters associated with the "guard tour path" signature profile. In response to setting the parameters associated with the "guard tour path" signature profile, the control unit server 104 transmits an indication back to the security system 134 indicating completion of setting the "guard tour path" signature profile.

During 206, the security system 134 may determine a dynamically generated guard tour path 136 for the guard 137 based on obtaining sensor data from the monitoring system. Specifically, the security system 134 may generate the guard tour path 136 based on a location of the one or more speakers 108, the one or more cameras 110, the one or more lights 112, the one or more sensors 114, and the one or more home devices 116. In addition, the security system 134 may add checkpoints to the guard tour path 136 in locations around the monitored property 102 that have a higher density of these devices. In other implementations, the security system 134 may add checkpoints to the guard tour path 136 in locations around the monitored property 102 that have a low density of these devices to ensure the monitored property 102 is properly secured in each area. In other implementations, the signature profile for monitoring the guard around the monitored property 102 may include a guard tour path 136 that is dynamically generated. Therefore, the security system 134 can obtain the dynamically generated guard tour path from the signature profile.

During 208, the security system 134 transmits a notification to the client device 140 associated with the guard 137 to alert the guard 137 to start the guard tour. Specifically, the client device 140 may display a message to the guard 137 stating "Start guard tour." In other implementations, a guard tour time may not be required by the "guard tour path" signature profile and the guard 137 may tour the monitored property 102 each time he or she arrives at the monitored property 102.

During 210, the security system 134 may provide a guard tour path 136 associated with the "guard tour path" signature profile to the guard 137. Specifically, the security system 134 may transmit the dynamically generated guard tour path 136 to the client device 140 associated with the guard 137.

FIG. 3 is a flowchart of an example process 300 for providing an indication to a property owner of the property that user is not following the guard tour path. Generally, the process 300 includes receiving an indication from a user indicating an initiation of a guard tour path at a property; obtaining data indicating a presence of the user at checkpoints along the guard tour path on the property monitored by a monitoring system; in response to obtaining data indicating the presence of the user at each of the checkpoints on the property, determining whether the user is following the guard tour path; in response to determining that the user is not following the guard tour path, providing an indication to the user to return to the guard tour path; and, providing an indication to a property owner of the property that the user is not following the guard tour path.

During 302, the control unit server 104 receives data indicating a presence of a user, such as a guard at 131B, at a monitored property 102. 302 may be similar to 202.

During 304, the control unit server 104 obtains data indicating a presence of the guard 137 at checkpoints along the guard tour path 136 on the monitored property 102. Specifically, the guard tour path 136 may include one or more checkpoints for the guard 137 to interact with in the integrated security environment 100. To ensure the guard 137 interacts with the checkpoints along the guard tour path 136 in a timely manner, the guard 137 must interact with one or more devices at each checkpoint within a predetermined period and the guard 137 must interact with the one or more devices in a particular manner, such as pressing a light switch three times. In response to interacting with at least one or more of the devices at each checkpoint within a predetermined period, the at least one or more of the devices transmits a notification to the control unit server 104 indicating the guard 137 has arrived at the checkpoint. For example, the guard 137 may interact with the light device 122 to trigger a notification to be sent to the control unit server 104. The control unit server 104 can determine from the notification that the guard 137 has arrived at the next checkpoint by comparing data in the notification to a set of predefined interactions stored in a signature profile. The light device 122 can include one or more light switches and a dimmer. The guard 137 may press the one or more light switches three times to indicate to the control unit server 104 that the guard 137 has arrived at the checkpoint. Alternatively, if the guard 137 presses the one or more light switches two times, the control unit server 104 may not receive the indication that the guard 137 has arrived at the checkpoint. In another example, the guard 137 may move the dimmer between 0 and 100 percent four times to indicate to the control unit server 104 that the guard 137 has arrived at the checkpoint. In another example, the guard 137 may hold at least one of the light switches on the light device 122 down for three seconds to indicate to the control unit server 104 that the guard 137 has arrived at the checkpoint.

During 306, in response to obtaining data indicating the presence of the guard 137 at each of the checkpoints on the monitored property 102, the control unit server 104 determines whether the guard 137 is following the guard tour path 136. Specifically, the control unit server 104 may track the client device 140 associated with the guard 137 using a GPS sensor included in the client device 140. Should the control unit server 104 notice the client device 140 veering off the guard tour path 136, the control unit server 104 can send an indication to the security system 134 that the guard 137 is off path.

During 308, in response to determining that the user is not following the guard tour path 136, the security system 134 may provide an indication to the guard 137 to return to the guard tour path 136. Specifically, the security system 134 may transmit a notification to the client device 140 associated with the guard 137 to return to the guard tour path 136. For example, the notification may include a push notification, a short messaging service (SMS), or an instant message.

During 310, the security system 134 may provide an indication to the property owner 134 of the monitored property that the guard 137 is not following the guard tour path 136. Specifically, the security system 134 may transmit a notification to the client device 126 associated with the property owner 131 indicating that the guard tour 131B is not following the guard tour path 136. In another example, the security system 134 may transmit a request to the client device 126 requesting if a call to the client device 140 should be placed. Should the property manager 131 accept the request, the security system 134 can place a phone call from client device 126 to client device 140.

FIG. 4 is a flowchart of an example process 400 for providing a location as a checkpoint on the guard tour path to the user. Generally, the process 400 includes receiving an indication from a user indicating an initiation of a guard tour path at a property; receiving data from devices included in the monitoring system monitoring the property; determining the data includes unusual activity by comparing the data to various data values and determining the data exceeds the various data values; determining a location on the property associated with unusual activity; and, in response to determining the location on the property associated with the unusual activity, providing the location as a checkpoint on the guard tour path to the user.

During 402, the control unit server 104 receives data indicating a presence of a user, such as a guard at 131B, at a monitored property 102. 402 may be similar to 302 and 202.

During 404, the control unit server 104 receives data from one or more devices included in the monitored property 102. Specifically, the control unit server 104 may receive data from the one or more speakers 108, the one or more cameras 110, the one or more lights 112, the one or more sensors 114, and the one or more home devices 114.

During 406, the control unit server 104 determines that the received data includes unusual activity by comparing the received data to determined data values and determining that the received data exceeds the predetermined data values. Specifically, the control unit server 104 may receive an indication from the one or more sensors 114 locates at the outhouse 130 and determine that unusual activities may be occurring because the control unit server 104 determines that a location where the received data came from does not match any location found on the guard tour path 136 or the time of the unusual activity. Additionally, the one or more sensors 114 that provided the received data to the control unit server 104 are required to be idle. The control unit server 104 may compare the received indication from the one or more sensors 114 to predetermined values for the one or more sensors 114 during the specific guard tour path 136. The predetermined values may indicate to the control unit server 104 values that the one or more sensors 114 should provide while the guard 137 is on the guard tour path 136. Specifically, the predetermined values may dynamically change based on a location of the guard 137 on the guard tour path 136. For example, the one or more sensors 114 located in the basement during stage (B) may be more active when the guard 137 is located in the basement while the one or more sensors 114 located near the outhouse 130 should be idle. Additionally, the one or more sensors 114 located on the second floor during stage (C) may be more active when the guard 137 is located on the second floor while the one or more sensors 114 located near the basement which were recently active, are now idle.

During 408, the control unit server 104 determines a location on the monitored property 102 associated with the unusual activity. Specifically, the control unit server 104 determines the location on the monitored property 102 associated with the unusual activity by comparing locations associated with one or more sensors 114 that may be required to be idle during the guard tour path 136 with locations associated with one or more sensors 114 that may not be idle and provide sensor data. For example, some doors, such as front door 121, may require users to badge out to exit. If the front door 121 opens without properly badging, the control unit server 104 may determine unusual activity at the front door 121. Additionally, the control unit server 104 may track of a number of users that badge in to the front door 121 and subsequently, track the number of users that exit the front door 121 by badging out or interacting with an indoor panel, such as a "request-to-exit" buttons. Should the control unit server 104 determine that the number of users who badged in to the front door 121 does not match the number of users who badged out of the front door 121 after a particular event, such as arming the home, the control unit server 104 may determine an occurrence of unusual activity at the front door 121.

During 410, in response to determining the location on the monitored property associated with the unusual activity, the security system 134 may provide the location as a checkpoint on the guard tour path 136 to the guard 137. Specifically, the control unit server 104 transmits a notification to the client device 140 associated with the guard 137 that indicates to the guard 137 a new checkpoint added to the guard tour path 136. In response to receiving the new path added to the guard tour path 136 at the client device 140, the guard 137 may interact with the client device 140 to indicate to the control unit server 104 an acceptance of adding the new checkpoint to the guard tour path 136. Additionally, the control unit server 104 transmits the notification to the security system 134 to indicate an update to the checkpoints on the guard tour path 136. In response, the security system 134 may transmit a notification to the client device 126 associated with the property owner 131 to indicate that a new checkpoint has been added to the guard tour path 136.

Figure 5:
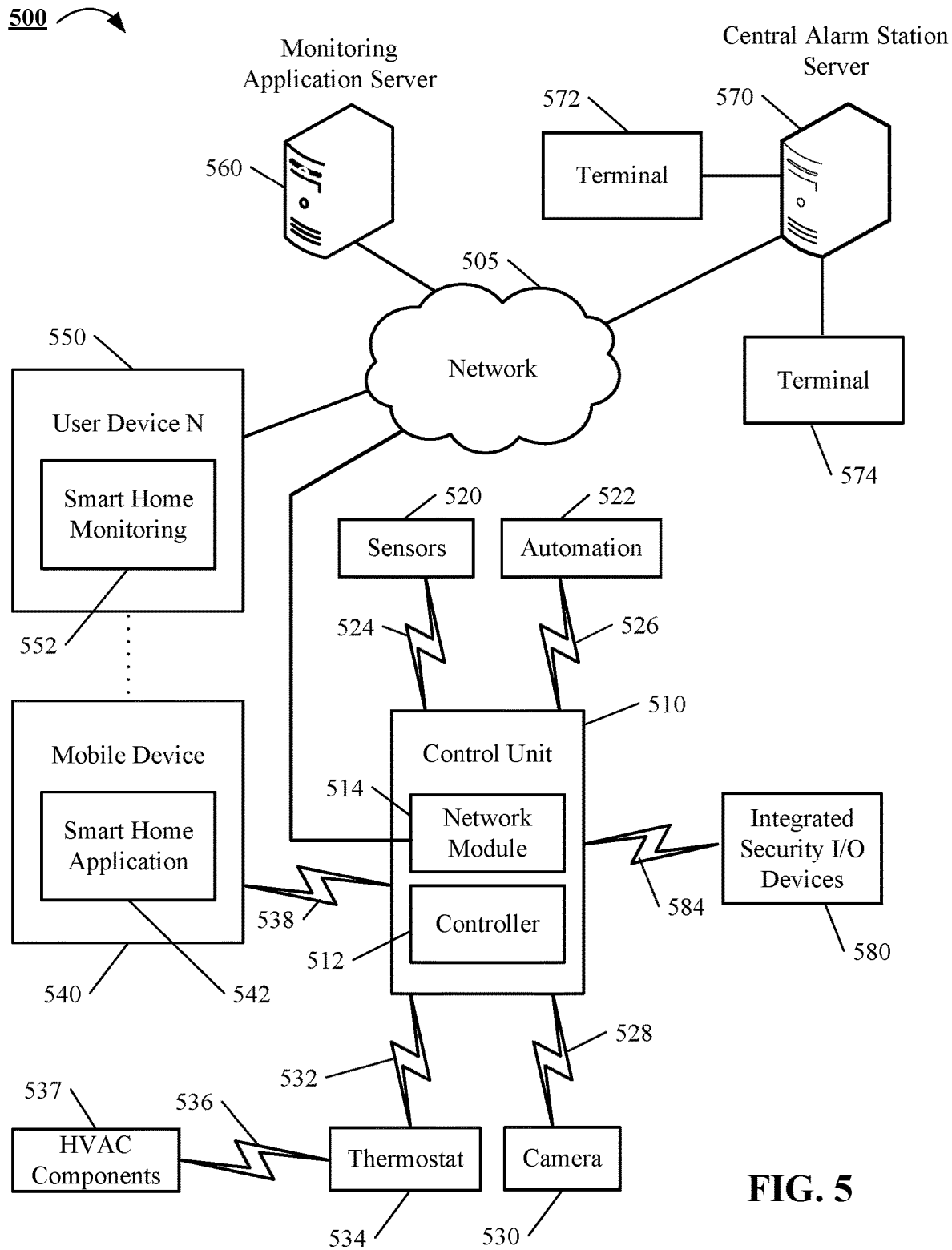
FIG. 5 is a block diagram of an example of a guard tour tracking system for monitoring a guard tour at a particular facility that may utilize various security components.

FIG. 5 is a block diagram of an example of a guard tour tracking system 500 for monitoring a guard tour at a particular facility, such as monitored facility 102, that may utilize various security components. The electronic system 500 includes a network 505, a control unit 510, one or more user devices 540 and 550, a monitoring application server 560, and a central alarm station server 570. In some examples, the network 505 facilitates communications between the control unit 510, the one or more user devices 540 and 550, the monitoring application server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a guard tracking control system. In these examples, the controller 512 may be configured to receive input from sensors, cameras, or other devices included in the control unit system and control operations of devices included in the household (e.g., speakers, lights, doors, etc.). For example, the controller 512 may be configured to control operation of the network module 514 included in the connected valve unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the connected valve unit 510 to communicate over a local area network and/or the Internet. The network module 514 also may be a voiceband modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag.

The control unit 510 communicates with the automation module 522 and the camera 530 to perform monitoring. The automation module 522 is connected to one or more devices that enable home automation control. For instance, the automation module 522 may be connected to one or more lighting systems and may be configured to control operation of the one or more lighting systems. Also, the automation module 522 may be connected to one or more electronic locks at the property and may be configured to control operation of the one or more electronic locks (e.g., control Z-Wave locks using wireless communications in the Z-Wave protocol. Further, the automation module 522 may be connected to one or more appliances at the property and may be configured to control operation of the one or more appliances. The automation module 522 may include multiple modules that are each specific to the type of device being controlled in an automated manner. The automation module 522 may control the one or more devices based on commands received from the connected valve unit 510. For instance, the automation module 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or within a monitored property 102 monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the connected valve unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring application server 560 over the Internet. In these implementations, image data captured by the camera 530 does not pass through the control unit 510 and the camera 530 receives commands related to operation from the monitoring application server 560.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices. The robotic devices may be any type of robots that are capable of moving and taking actions that assist in security monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the monitoring system 500 for use in appropriate circumstances. For instance, a robotic vacuum cleaner device may be associated with the monitoring system 500 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the control unit 510, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the control unit 510. Other types of short-range wireless communication protocols, such as Bluetooth, Bluetooth LE, Zwave, Zigbee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 500. For instance, after completion of a monitoring operation or upon instruction by the control unit 510, the robotic devices may be configured to automatically fly to and land on one of the charging stations. In this regard, the robotic devices may automatically maintain a fully charged battery in a state in which the robotic devices are ready for use by the monitoring system 500.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices. Additionally, the one or more control units 510 may receive one or more sensor data from the sensors 520 and determine whether to provide an alert to the one or more integrated security input/output devices 580.

The sensors 520, the module 522, the camera 530, the thermostat 534, and the mixing valve devices 580 communicate with the controller 512 over communication links 524, 526, 528, 532, 584, and 586. The communication links 524, 526, 528, 532, 584, and 586 may be a wired or wireless data pathway configured to transmit signals from the sensors 520, the module 522, the camera 530, the thermostat 534, and the mixing valve devices 580 to the controller 512. The sensors 520, the module 522, the camera 530, the thermostat 534, and the mixing valve devices 580 may continuously transmit sensed values to the controller 512, periodically transmit sensed values to the controller 512, or transmit sensed values to the controller 512 in response to a change in a sensed value.

The communication links 524, 526, 528, 532, 584, and 586 may include a local network. The sensors 520, the module 522, the camera 530, the thermostat 534, and the integrated security devices 580 and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 560 is an electronic device configured to provide monitoring services by exchanging electronic communications with the control unit 510, the one or more user devices 540 and 550, and the central alarm station server 570 over the network 505. For example, the monitoring application server 560 may be configured to monitor events (e.g., alarm events) generated by the control unit 510. In this example, the monitoring application server 560 may exchange electronic communications with the network module 514 included in the control unit 510 to receive information regarding events (e.g., alerts) detected by the control unit 108. The monitoring application server 560 also may receive information regarding events (e.g., alerts) from the one or more user devices 540 and 550.

In some examples, the monitoring application server 560 may route hot water control data received from the network module 514 or the one or more user devices 540 and 550 to the central alarm station server 570. For example, the monitoring application server 560 may transmit the hot water control data to the central alarm station server 570 over the network 505.

The monitoring application server 560 may store sensor and image data received from the monitoring system and perform analysis of sensor and image data received from the monitoring system. Based on the analysis, the monitoring application server 560 may communicate with and control aspects of the control unit 510 or the one or more user devices 540 and 550.

The central alarm station server 570 is an electronic device configured to provide alarm monitoring service by exchanging communications with the control unit 510, the one or more mobile devices 540 and 550, and the monitoring application server 560 over the network 505. For example, the central alarm station server 570 may be configured to monitor hot water control events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring application server 560.

The central alarm station server 570 is connected to multiple terminals 572 and 574. The terminals 572 and 574 may be used by operators to process alerting events. For example, the central alarm station server 570 may route hot water control data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more user devices 540 and 550 are devices that host and display user interfaces. For instance, the user device 540 is a mobile device that hosts one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring application server 560 and/or the control unit 510 over the network 505. The user device 550 may be configured to display a smart home user interface 552 that is generated by the user device 550 or generated by the monitoring application server 560. For example, the user device 550 may be configured to display a user interface (e.g., a web page) provided by the monitoring application server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Zwave, Zigbee, HomePlug (ethernet over powerline), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring application server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring application server 560 may relay data received from the control unit 510 to the one or more user devices 540 and 550 through the network 505. In this regard, the monitoring application server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring application server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring application server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 only includes the one or more user devices 540 and 550, the sensors 520, the module 522, the camera 530, and the robotic devices. The one or more user devices 540 and 550 receive data directly from the sensors 520, the module 522, the camera 530, and the robotic devices and sends data directly to the sensors 520, the module 522, the camera 530, and the robotic devices. The one or more user devices 540, 550 provide the appropriate interfaces/processing to provide visual surveillance and reporting.

In other implementations, the system 500 further includes network 505 and the sensors 520, the module 522, the camera 530, the thermostat 534, and the robotic devices are configured to communicate sensor and image data to the one or more user devices 540 and 550 over network 505 (e.g., the Internet, cellular network, etc.). In yet another implementation, the sensors 520, the module 522, the camera 530, the thermostat 534, and the robotic devices (or a component, such as a bridge/router) are intelligent enough to change the communication pathway from a direct local pathway when the one or more user devices 540 and 550 are in close physical proximity to the sensors 520, the module 522, the camera 530, the thermostat 534, and the robotic devices to a pathway over network 505 when the one or more user devices 540 and 550 are farther from the sensors 520, the module 522, the camera 530, the thermostat 534, and the robotic devices. In some examples, the system leverages GPS information from the one or more user devices 540 and 550 to determine whether the one or more user devices 540 and 550 are close enough to the sensors 520, the module 522, the camera 530, the thermostat 534, and the robotic devices to use the direct local pathway or whether the one or more user devices 540 and 550 are far enough from the sensors 520, the module 522, the camera 530, the thermostat 534, and the robotic devices that the pathway over network 505 is required. In other examples, the system leverages status communications (e.g., pinging) between the one or more user devices 540 and 550 and the sensors 520, the module 522, the camera 530, the thermostat 534, and the robotic devices to determine whether communication using the direct local pathway is possible. If communication using the direct local pathway is possible, the one or more user devices 540 and 550 communicate with the sensors 520, the module 522, the camera 530, the thermostat 534, and the robotic devices using the direct local pathway. If communication using the direct local pathway is not possible, the one or more user devices 540 and 550 communicate with the sensors 520, the module 522, the camera 530, the thermostat 534, and the robotic devices using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 uses several techniques to reduce costs while providing access to significant levels of useful visual information.

In some implementations, a state of the monitoring system and other events sensed by the monitoring system may be used to enable/disable video/image recording devices (e.g., the camera 430). In these implementations, the camera 530 may be set to capture images on a periodic basis when the alarm system is armed in an "Away" state, but set not to capture images when the alarm system is armed in a "Stay" state or disarmed. In addition, the camera 530 may be triggered to begin capturing images when the alarm system detects an event, such as an alarm event, a door opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
    one or more sensors that are located throughout the property and that are configured to generate sensor data; and
    one or more computers and one or more storage devices on which are stored instructions that are operable, when executed by the one or more computers, to cause the one or more computers to perform operations comprising:
        determining to initiate a path signature profile for the property;
        in response to determining to initiate the path signature profile for the property, accessing, from a database and using data for the path signature profile, first data that indicates an entity path at the property;
        sending, using the first data that indicates the entity path at the property, second instructions to one or more devices for the property to cause each of the one or more devices to present information about the entity path;
        receiving sensor data from the one or more sensors included in the monitoring system that is configured to monitor the property;
        determining that the sensor data indicates unusual activity at the property;
        determining, using the sensor data, a location on the property associated with an entity;
        determining, using the sensor data and the determination of the unusual activity, a location on the property associated with the unusual activity;
        in response to determining the location on the property associated with the unusual activity and the location on the property associated with the entity, adding, to the first data indicating the entity path, second data that indicates the location as a checkpoint on the entity path; and
        in response to adding the second data that indicates the location as a checkpoint on the entity path, sending third instructions to one or more physical signaling devices that are separate from the one or more computers to activate the one or more physical signaling devices to indicate the location of the checkpoint.

2. The monitoring system of claim 1, wherein determining that the sensor data indicates unusual activity at the property comprises comparing the sensor data to at least one threshold and determining the sensor data exceeds the at least one threshold.

3. The monitoring system of claim 1, wherein receiving the sensor data from the one or more sensors included in the monitoring system that is configured to monitor the property comprises receiving image data from one or more cameras included in the monitoring system that is configured to monitor the property.

4. The monitoring system of claim 1, wherein determining that the sensor data indicates unusual activity at the property comprises determining that the sensor data does not match any location found on the entity path.

5. The monitoring system of claim 1, wherein determining that the sensor data indicates unusual activity at the property comprises determining that the sensor data indicates unusual activity at the property based on a time of the sensor data indicating the unusual activity.

6. The monitoring system of claim 1, wherein determining that the sensor data indicates unusual activity at the property comprises comparing the sensor data to predetermined values for the one or more sensors expected during entity traversal of the entity path and determining that the sensor data indicates unusual activity at the property based on the comparison revealing that the sensor data is misaligned with the predetermined values for the one or more sensors expected during entity traversal of the entity path.

7. The monitoring system of claim 6, wherein the predetermined values dynamically change based on an entity location of the entity on the entity path.

8. The monitoring system of claim 1, wherein adding the location as the checkpoint on the entity path comprises transmitting a notification to a client device associated with the entity that indicates to the entity a new checkpoint added to the entity path.

9. The monitoring system of claim 1, wherein adding the location as the checkpoint on the entity path comprises adding a new checkpoint on the entity path based on acceptance, by the entity, of addition of the new checkpoint to the entity path.

10. The monitoring system of claim 1, wherein the operations further comprise, in response to determining the location on the property associated with the unusual activity, determining whether a distance between the unusual activity and the entity path satisfies a threshold distance, wherein:

adding the location as a checkpoint on the entity path is responsive to determining that the distance between the unusual activity and the entity path satisfies the threshold distance.

11. The monitoring system of claim 1, wherein determining that the sensor data indicates the unusual activity at the property comprises determining that the entity departed from the entity path.

12. The monitoring system of claim 1, comprising providing an instruction to at least one physical signaling device of the one or more physical signaling devices that causes the at least one physical signaling device to request user selection of an input device.

13. The monitoring system of claim 1, wherein the operations further comprise:

determining that the sensor data indicates unusual activity at the property comprises determining that the location includes a quantity of unmonitored devices that satisfies a threshold quantity; and adding the location as a checkpoint on the entity path is responsive to determining the location on the property associated with the unusual activity and determining that the location includes the quantity of unmonitored devices that satisfies the threshold quantity.

14. The monitoring system of claim 1, wherein the operations further comprise:

receiving an indication of the entity located at the property;

determining that at least one component of the monitoring system is in an unexpected state; and determining a number of checkpoints on the entity path using data indicating that the at least one component of the monitoring system is in the unexpected state.

15. The monitoring system of claim 1, wherein sending the second instructions causes the one or more devices to present information about the entity path by performing at least one of unlocking a lock, or providing the information about the entity path to a device for the entity.

16. The monitoring system of claim 1, wherein determining that the sensor data indicates unusual activity at the property comprises:

selecting, using the location on the property associated with the entity, a sensor threshold;

determining whether the sensor data satisfies the sensor threshold; and in response to determining that the sensor data does not satisfy the sensor threshold that was selected using the location on the property associated with the entity, determining that the sensor data indicates unusual activity at the property.

17. A method comprising:

determining, by a monitoring system implemented on one or more computers, to initiate a path signature profile for a property;

in response to determining to initiate the path signature profile for the property, accessing, by the monitoring system from a database and using data for the path signature profile, first data that indicates an entity path at the property;

sending, by the monitoring system and using the first data that indicates the entity path at the property, first instructions to one or more devices for the property to cause each of the one or more devices to present information about the entity path;

receiving, by the monitoring system and from one or more sensors that are located throughout the property, sensor data from one or more sensors included in a monitoring system that is configured to monitor the property;

determining, by the monitoring system, that the sensor data indicates unusual activity at the property;

determining, by the monitoring system and using the sensor data, a location on the property associated with an entity;

determining, by the monitoring system and using the sensor data and the determination of the unusual activity, a location on the property associated with the unusual activity;

in response to determining the location on the property associated with the unusual activity and the location on the property associated with the entity, adding, by the monitoring system and to the first data indicating the entity path, second data that indicates the location as a checkpoint on the entity path; and in response to adding the second data that indicates the location as a checkpoint on the entity path, sending, by the monitoring system, second instructions to one or more physical signaling devices that are separate from the one or more computers to activate the one or more physical signaling devices to indicate the location of the checkpoint.

18. The method of claim 17, wherein determining that the sensor data indicates unusual activity at the property comprises comparing the sensor data to at least one threshold and determining the sensor data exceeds the at least one threshold.

19. The method of claim 17, wherein receiving the sensor data from the one or more sensors included in the monitoring system that is configured to monitor the property comprises receiving image data from one or more cameras included in the monitoring system that is configured to monitor the property.

20. The method of claim 17, wherein determining that the sensor data indicates unusual activity at the property comprises determining that the sensor data does not match any location found on the entity path.

21. The method of claim 17, wherein determining that the sensor data indicates unusual activity at the property comprises determining that the sensor data indicates unusual activity at the property based on a time of the sensor data indicating the unusual activity.

22. The method of claim 17, wherein determining that the sensor data indicates unusual activity at the property comprises comparing the sensor data to predetermined values for the one or more sensors expected during the entity path and determining that the sensor data indicates unusual activity at the property based on the comparison revealing that the sensor data is misaligned with the predetermined values for the one or more sensors expected during the entity path.

23. The method of claim 22, wherein the predetermined values dynamically change based on an entity location of the entity on the entity path.

24. The method of claim 17, wherein adding the location as the checkpoint on the entity path comprises transmitting a notification to a client device associated with the entity that indicates to the entity a new checkpoint added to the entity path.

25. The method of claim 17, wherein adding the location as the checkpoint on the entity path comprises adding a new checkpoint on the entity path based on acceptance, by the entity, of addition of the new checkpoint to the entity path.

\* \* \* \* \*